(12) United States Patent
Murayama et al.

(10) Patent No.: US 8,915,338 B2
(45) Date of Patent: Dec. 23, 2014

(54) INPUT DEVICE OF VEHICLE BRAKE SYSTEM

(75) Inventors: Kazuaki Murayama, Saitama (JP); Takaaki Ohnishi, Saitama (JP); Hideo Miyabayashi, Tochigi (JP); Motoyasu Nakamura, Tochigi (JP); Yoshiteru Matsunaga, Tochigi (JP); Yoshiyuki Takamatsu, Tochigi (JP); Nobuyuki Kobayashi, Tochigi (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 86 days.

(21) Appl. No.: 13/297,650

(22) Filed: Nov. 16, 2011

(65) Prior Publication Data
US 2012/0118682 A1 May 17, 2012

(30) Foreign Application Priority Data
Nov. 17, 2010 (JP) .................................. 2010-257362

(51) Int. Cl.
| B60T 11/00 | (2006.01) |
| B60J 7/00 | (2006.01) |
| B60T 13/74 | (2006.01) |
| B60T 13/16 | (2006.01) |
| B60T 13/66 | (2006.01) |
| B60T 13/68 | (2006.01) |

(52) U.S. Cl.
CPC ............. *B60T 13/745* (2013.01); *B60T 13/166* (2013.01); *B60T 13/662* (2013.01); *B60T 13/686* (2013.01)
USPC .......................................... 188/352; 296/208

(58) Field of Classification Search
CPC .. B60H 1/00564; B60H 1/0055; B60H 1/246; B60H 1/247; B62D 25/142
USPC ............... 188/152, 352, 355–360; 303/113.4, 303/155; 60/534; 296/208
See application file for complete search history.

(56) References Cited

U.S. PATENT DOCUMENTS

| 3,714,780 | A | * | 2/1973 | Shellhause ....................... 60/533 |
| 2004/0084959 | A1 | * | 5/2004 | Kusano ....................... 303/119.2 |
| 2008/0236962 | A1 | * | 10/2008 | Suzuki et al. .................. 188/152 |
| 2010/0248606 | A1 | * | 9/2010 | Kanda ........................... 454/145 |

FOREIGN PATENT DOCUMENTS

| JP | S59-067671 U | 5/1984 |
| JP | 2007-099057 A | 4/2007 |
| JP | 2007-176277 A | 7/2007 |
| JP | 2010-023594 A | 2/2010 |

* cited by examiner

*Primary Examiner* — Vishal Sahni
(74) *Attorney, Agent, or Firm* — Carrier Blackman & Associates, P.C.; Joseph P. Carrier; William D. Blackman

(57) ABSTRACT

The present invention provides an input device of a vehicle brake system, the input device being a separate unit from an electric brake actuator, the electric brake actuator for generating a first fluid pressure, the input device of the vehicle brake system comprising: a master cylinder for generating a second fluid pressure; a stroke simulator for applying a simulated reaction force, the stroke simulator and the master cylinder forming an attachment body, with the stroke simulator disposed in communication with the master cylinder; and a component storage box provided on the attachment body for a component of either one of the master cylinder and the stroke simulator, wherein the attachment body has a vent hole with a first end in communication with the component storage box and a second end in communication with a space formed before a surface of a dashboard having the input device mounted thereon.

10 Claims, 5 Drawing Sheets

INPUT DEVICE OF VEHICLE BRAKE SYSTEM

CROSS-REFERENCE TO RELATED APPLICATION

This application claims the foreign priority benefit under 35 U.S.C §119 of Japanese Patent Application No. 2010-257362 filed on Nov. 17, 2010, the disclosure of which is incorporated herein by reference.

BACKGROUND OF THE INVENTION

1. Field of the Invention

The present invention relates to an input device of a vehicle brake system.

2. Description of the Invention

As a brake system for a vehicle (automobile), there has been known, for example, one including a servo unit such as a vacuum booster or a hydraulic booster. In recent years, there has been known an electric booster driven by an electric motor (See, for example, Japanese Unexamined Patent Application Publication No. 2010-23594, hereinafter referred to as Publication 1).

The electric booster of the Publication 1 includes a main piston, a booster piston, and an electric motor. The main piston moves forward and rearward when a driver operates a brake pedal. The main piston is cylindrically shaped, and fitted in the booster piston to be displaced relative to the main piston. The electric motor drives the booster piston.

In this electric booster, the main piston and the booster piston serve as pistons of a master cylinder, and have respective front end portions located inside a pressure chamber of the master cylinder. The main piston is imparted a thrust by the driver's operation of the brake pedal and the booster piston is imparted a booster thrust by the electric motor to generate a brake fluid pressure in the master cylinder.

In the electric booster of the Publication 1, however, since a mechanism of imparting the brake pedal thrust and a mechanism of imparting the electric motor booster thrust are configured as an integral unit, the entire size thereof tends to be increased, which leads to a reduction in the possibility of the layout of a brake system that includes the electric booster of the Publication 1.

The present invention has been made to solve the above-mentioned problem and it is an object of the present invention to provide an input device of a vehicle brake system that can increase the possibility of the layout of the vehicle brake system.

SUMMARY OF THE INVENTION

In one aspect of the present invention, there is provided an input device of a vehicle brake system, the input device provided as a separate unit from an electric brake actuator and having a brake operation element, the brake operation element being attached to a dashboard for being operated by an operator, the electric brake actuator for generating a brake fluid pressure on the basis of at least an electric signal produced according to the operation of the brake operation element, the input device of the vehicle brake system comprising: a master cylinder for generating a fluid pressure when the operation of the brake operation element is input into the master cylinder; a stroke simulator for applying a simulated reaction force produced by the operation of the brake operation element to the brake operation element, the stroke simulator and the master cylinder forming an attachment body, with the stroke simulator disposed in parallel to the master cylinder and in communication with the master cylinder; and a component storage box provided on the attachment body made of the master cylinder and the stroke simulator, the component storage box being for containing a component provided in relation to at least either one of the master cylinder and the stroke simulator, wherein the attachment body has a vent hole with a first end in communication with an inside of the component storage box and a second end in communication with a space formed before a surface of the dashboard having the input device mounted thereon.

According to the input device of the vehicle brake system, since the stroke simulator is formed integrally with the master cylinder, a downsized (compact) input device can be realized.

Also, according to the input device of the vehicle brake system, the component provided in relation to at least either one of the master cylinder and the stroke simulator can be mounted in the component storage box, and the component storage box can be attached to the attachment body made of the master cylinder and the stroke simulator. As a result, a downsized (compact) input device can be realized.

Also, according to the input device of the vehicle brake system, when the input device is incorporated into the vehicle brake system as a component thereof, the input device can be disposed as a separate unit from the electric brake actuator. This results in an increase in the possibility of the layout of the vehicle brake system. In other words, in general, a room where a power source is mounted (engine room) has therein various devices such as: a power source (engine and/or driving motor); a transmission; a cooling system including a radiator; and a low voltage battery, which makes it difficult to ensure a large empty space (installation space) in the engine room. On the other hand, in the present invention, by disposing the input device separately from the electric brake actuator in the engine room, the individual devices can be downsized, eliminating the need for ensuring a large empty space in the engine room. As a result, it becomes possible to establish a vehicle braking system that can be installed in a rather small space.

Also, according to the input device of the vehicle brake system, since the input device can be disposed as a separate unit from the electric brake actuator, by disposing the motor cylinder device remotely from a driver seat, the driver can avoid feeling odd (uncomfortable) with noise and oscillations arising from the motor cylinder device when the motor cylinder device is a source of noise and oscillations.

Also, according to the input device of the vehicle brake system, since the second end of the vent hole, which serves as an aperture of the component storage box, is in communication with the space formed before the surface of the dashboard having the input device mounted thereon, and is covered with the dashboard to prevent intrusion of foreign matter and water through the vent hole into the component storage box, the input device has improved reliability in the behaviors of the component stored inside the component storage box.

The input device of the vehicle brake system may be constituted in such a manner the master cylinder has a portion extending through the dashboard into a vehicle compartment, and the second end of the vent hole is formed close to the master cylinder.

With the above constitution of the input device of the vehicle brake system, air is exchanged between the vent hole and the vehicle compartment through the gap formed between the master cylinder and the dashboard.

The input device of the vehicle brake system may be constituted in such a manner the attachment body is attached to the dashboard via a gasket and a gap is formed between the master cylinder and the dashboard, the gasket extending along an outer periphery of the attachment body.

With the above constitution of the input device of the vehicle brake system, the gasket enables communication of the vent hole with the engine room only through the gap formed between the master cylinder and the dashboard. This prevents more effectively intrusion of foreign matter and water through the vent hole from the outside into the sensor valve unit.

The input device of the vehicle brake system has a structure that the vent hole has a waterproof and breathable member disposed at the second end thereof.

With the above constitution of the input device of the vehicle brake system, it is possible to surely prevent foreign matter such as dust and the like (including water droplet) in the vehicle compartment from intruding through the vent hole into the sensor valve unit.

In the input device of the vehicle brake system, it is desirable that the attachment body has a lightening portion, the lightening portion having one side defined by the surface of the dashboard having the input device mounted thereon, the second end of the vent hole being in communication with the lightening portion.

With the above constitution of the input device of the vehicle brake system, since the vent hole has the second end in communication with the lightening portion, the lightening portion not only contributes to weight reduction of the input device but can also function as a dry area formed on the second end of the vent hole.

The input device of the vehicle brake system may be constituted in such a manner the attachment body is formed by casting and the lightening portion is formed during the casting process.

With the above constitution of the input device of the vehicle brake system, since the lightening portion is formed in consideration of shrinkage, running of molten metal, and the like, there is no need to provide a separate processing process such as machining only for forming the lightening portion resulting in improved production efficiency.

The input device of the vehicle brake system may be constituted in such a manner the component storage box is a sensor unit containing a sensor for detecting a fluid pressure in a fluid pressure passage, the fluid pressure passage communicating with at least either one of the master cylinder and the stroke simulator.

The input device of the vehicle brake system may be constituted in such a manner the component storage box is a valve unit containing a valve mechanism of opening and closing a fluid pressure passage, the fluid pressure passage communicating with at least either one of the master cylinder and the stroke simulator.

DETAILED DESCRIPTION OF THE PREFERRED EMBODIMENT

The present invention will be described in further detail by way of example with reference to the accompanying drawings. An input device according to an embodiment of the present invention has two main features of being disposed as a separate unit from an electric brake actuator when incorporated into a vehicle brake system and having a specific configuration.

In the following, first, there will be described an overall structure of the vehicle brake system according to the embodiment that is applied to a right-hand drive vehicle, and then, there will be described in further detail the input device of the vehicle brake system.

<Brake System>

In the embodiment, there will be described a vehicle brake system including both a brake-by-wire system, in which an electric signal is transmitted to actuate a brake, and, for failsafe operation, a conventionally utilized hydraulic brake system, in which a hydraulic pressure is transmitted to actuate the brake.

As used herein to describe the embodiment, the following directional terms "front, rear, above, below, right, and left" refer to those directions of the vehicle, and correspond to those directions mentioned in FIG. 1 as a top view.

Figure 1:
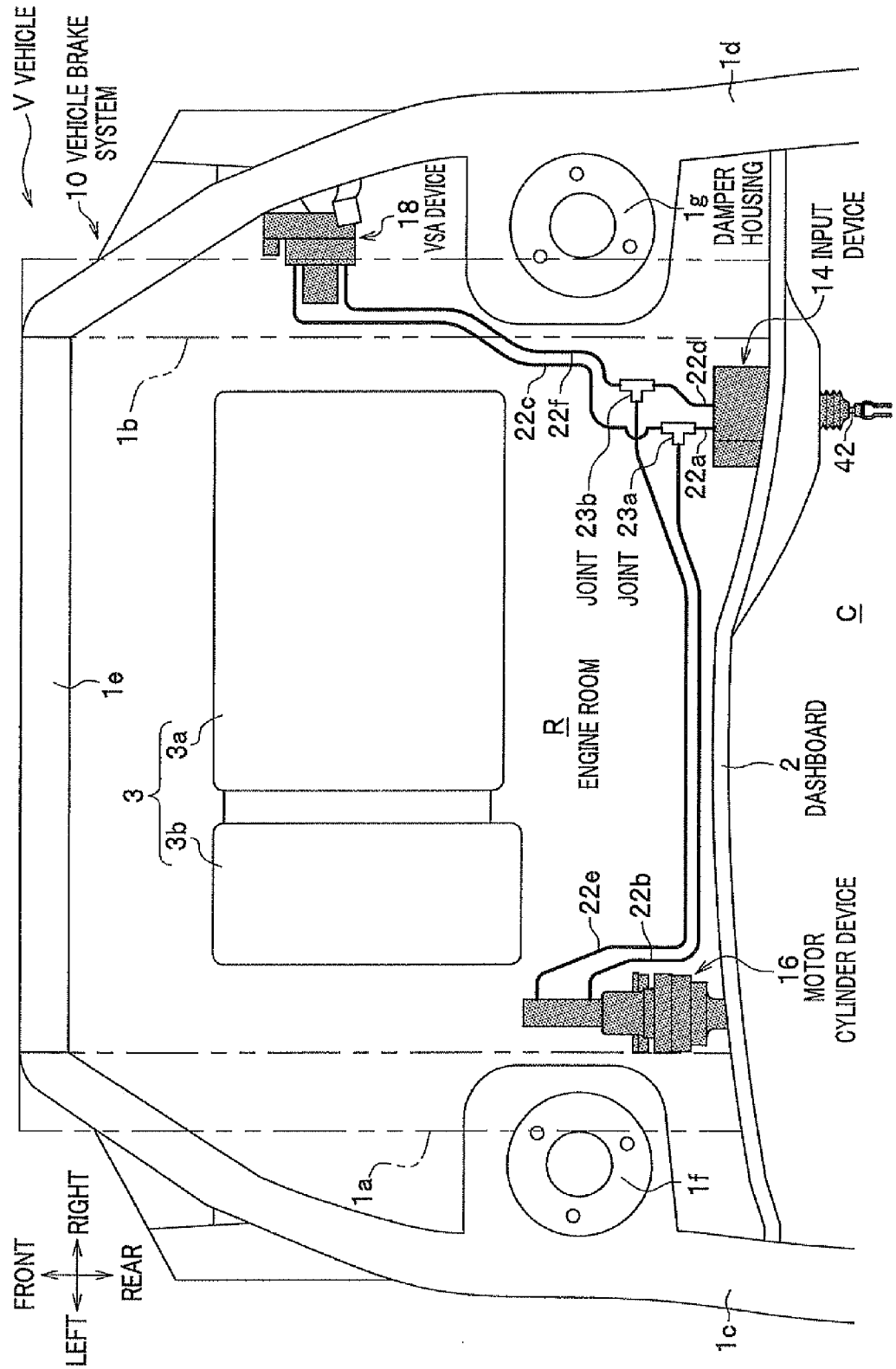
FIG. 1 is a view showing how essential components of a vehicle brake system, including an input device according to an embodiment of the present invention, are arranged.

As shown in FIG. 1, a vehicle brake system 10 includes an input device 14, a motor cylinder device (electric brake actuator) 16, and a vehicle stability assist device 18 (hereinafter referred to as a "VSA device 18", VSA® is a registered trademark). Brake operation is input to the input device 14 by a driver. The motor cylinder device 16 generates a brake fluid pressure on the basis of at least an electric signal produced according to the brake operation. The vehicle stability assist device 18 assists stabilization of vehicle behavior on the basis of the brake fluid pressure generated by the motor cylinder device. The input device 14, the motor cylinder device 16, and the VSA device 18 are disposed inside an engine room R of a vehicle V.

The motor cylinder device 16 may further include a means for generating a fluid pressure on the basis of an electric signal produced according to a physical quantity, in addition to the electric signal produced according to the driver's brake operation. The electric signal according to a physical quantity refers to a signal produced, for example by an ECU (Electronic Control Unit) determining the situations around the vehicle V using a sensor or the like, as in an automatic brake system, for avoiding collision of the vehicle V, but not by the driver's brake operation.

The engine room (engine compartment) R is disposed in front of a dashboard (firewall) 2 and is surrounded by a pair of front side frames 1a, 1b, a pair of upper members 1c, 1d, a bulkhead connection body le, and damper housings 1f, 1g. A vehicle compartment (passenger compartment) C is disposed behind the firewall 2 on a side opposite the engine compartment, as shown. The front side frames 1a, 1b extend in a longitudinal direction of the vehicle V at the opposite lateral sides of the vehicle V, respectively. The upper members 1c, 1d extend in the longitudinal direction of the vehicle V above the front side frames 1a, 1b, respectively, and are spaced apart by a predetermined distance from these front side frames 1a, 1b, respectively. The bulkhead connection body 1e is an approximately rectangular frame body made of a plurality of members, and is connected to front ends of the respective front side frames 1a, 1b. The damper housings 1f, 1g are provided close to the rear of the pair of upper members 1c, 1d in the longitudinal direction of the vehicle, to support an unillustrated strut. The strut is configured as, for example a front wheel damper made of a coil spring for absorbing shocks and a shock absorber for dampening oscillations.

The engine room R has therein devices such as a power generation device 3 as well as the vehicle brake system 10. The power generation device 3 may be, for example, a combination of an engine 3*a*, an electric motor (driving motor) 3*b* and a transmission (not illustrated), for use in a hybrid vehicle. The power generation device 3 is disposed approximately at the center of a space in the engine room R. Power generated by the engine 3*a* and the electric motor 3*b* is used to drive right and left front wheels via an unillustrated power transmission mechanism. Under a floor of a vehicle compartment C of the vehicle V or at the rear of the vehicle compartment C, there is mounted a high voltage battery (such as a lithium-ion battery) that supplies electric power to the electric motor 3*b* and that is charged with electric power (regenerative power) sent from the electric motor 3*b*. The vehicle V may be any one of a front-wheel-drive vehicle, a rear-wheel-drive vehicle and a four-wheel-drive vehicle.

Around the power generation device 3 in the engine room R, there are mounted various devices (accessories) such as an electric system including a low voltage battery that supplies electric power to unillustrated lamps, a suction system, an exhaust system, and a cooling system, as well as the vehicle brake system 10 to be described later.

The input device 14 according to the embodiment is to be applied to the right-hand drive vehicle. The input device 14 is secured on the right side of the dashboard 2 in the lateral direction of the vehicle V via a stud bolt 303 (See FIG. 3) in such a manner that a push rod 42 coupled to a brake pedal (brake operation element) 12 (See FIG. 3) extends through the dashboard 2 into the vehicle compartment C.

The input device 14 is mounted in a tilted state that a master cylinder 34 has a longitudinal axis tilted up relative to the horizontal plane toward the front of the vehicle V according to a tilt formed relative to the horizontal plane by a portion of the dashboard 2 to which the input device 14 is mounted.

The motor cylinder device 16 is disposed on the left side of the vehicle V and thus to the left of the input device 14, and is secured to, for example the front side frame 1*a* via an unillustrated bracket, and the motor cylinder device 16 is opposed to the input device 14 in a transverse direction of the vehicle. More specifically, the motor cylinder device 16 is elastically supported (suspended in the air) by the bracket that is fastened to the front side frame 1*a* by a fastening member such as a bolt for absorbing oscillations or the like occurring during actuation of the motor cylinder device 16.

The VSA device 18 is equipped with such functions as an ABS (anti-lock brake system) designed to prevent wheel locking during braking, a TCS (traction control system) designed to prevent loss of traction during acceleration and a function designed to reduce or suppress sliding sideways during turning. The VSA device 18 is attached to the vehicle body, for example via a bracket at the front right side of the vehicle. The VSA device 18 may be replaced with only the ABS designed to prevent wheel locking during braking.

The input device 14, the motor cylinder device 16, and the VSA device 18 are connected to each other through fluid pressure passages formed of, for example, metal pipes. The input device 14 and the motor cylinder device 16, which are components of the brake-by-wire system, are electrically connected to each other via an unillustrated harness.

Figure 2:
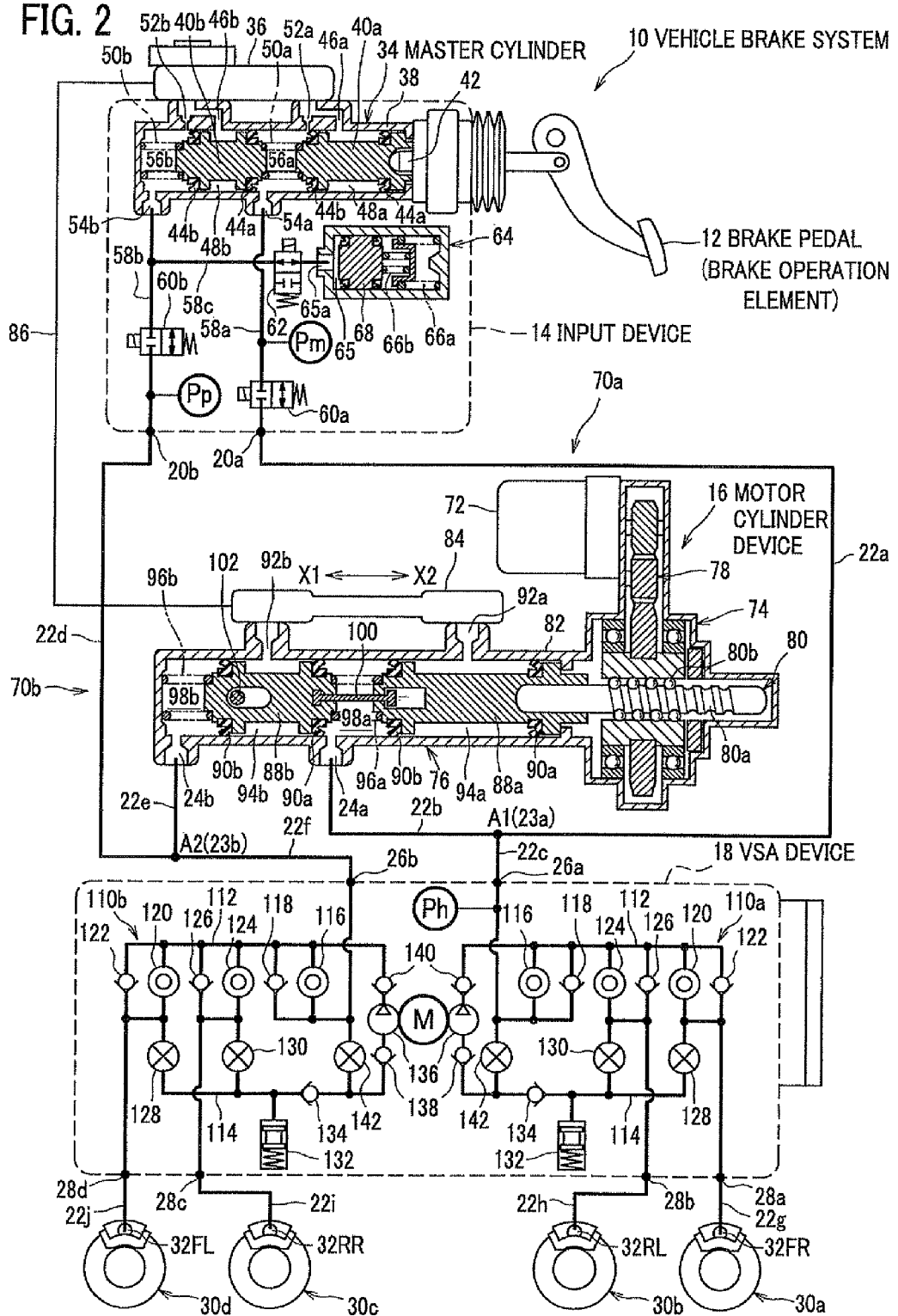
FIG. 2 is a schematic diagram showing the vehicle brake system of FIG. 1.

That is, the input device 14 and the VSA device 18 are connected to each other via a piping tube 22*a*, a joint (three-way branch pipe) 23*a*, a piping tube 22*c*, which are included in a first fluid pressure system 70*a* (See FIG. 2), as well as via a piping tube 22*d*, a joint (three-way branch pipe) 23*b*, and a piping tube 22*f*, which are included in a second fluid pressure system 70*b* (See FIG. 2).

The motor cylinder device 16 is connected to the joint 23*a* via the piping tube 22*b*, which is included in the first fluid pressure system 70*a* (See FIG. 2) and to the joint 23*b* via a piping tube 22*e*, which is included in the second fluid pressure system 70*b* (See FIG. 2).

Referring to FIG. 2, the fluid pressure passages of the vehicle brake system 10 will be described. A connection port 20*a* of the input device 14 and a coupling point A1 (the joint 23*a*) are connected to each other via the piping tube 22*a*. An output port 24*a* of the motor cylinder device 16 and the coupling point A1 are connected to each other via the piping tube 22*b*. An introduction port 26*a* of the VSA device 18 and the coupling point A1 are connected to each other via the piping tube 22*c*.

Also, a connection port 20*b* of the input device 14 and a coupling point A2 (the joint 23*b*) are connected to each other via the piping tube 22*d*. An output port 24*b* of the motor cylinder device 16 and the coupling point A2 are connected to each other via the piping tube 22*e*. An introduction port 26*b* of the VSA device 18 and the coupling point A2 are connected to each other via the piping tube 22*f*.

The VSA device 18 has a plurality of discharge ports 28*a*-28*d*. The discharge port 28*a* is connected via the piping tube 22*g* to the wheel cylinder 32FR of a disc brake mechanism 30*a* provided on a right front wheel. The discharge port 28*b* is connected via a piping tube 22*h* to a wheel cylinder 32RL of a disc brake mechanism 30*b* provided on a left rear wheel. The discharge port 28*c* is connected via a piping tube 22*i* to a wheel cylinder 32RR of a disc brake mechanism 30*c* provided on a right rear wheel. The discharge port 28*d* is connected via a piping tube 22*j* to the wheel cylinder 32FL of a disc brake mechanism 30*d* provided on a left front wheel.

In this case, through the piping tubes 22*g*-22*j* connected to the discharge ports 28*a*-28*d*, respectively, a brake fluid is supplied to the wheel cylinders 32FR, 32RL, 32RR, 32FL of the respective disc brake mechanisms 30*a*-30*d*, to increase a fluid pressure in each of the wheel cylinders 32FR, 32RL, 32RR, 32FL, to actuate each of the wheel cylinders 32FR, 32RL, 32RR, 32FL and provide a braking force for each of the corresponding wheels (the right front wheel, the left rear wheel, the right rear wheel, the left front wheel).

It should be noted that the vehicle brake system 10 can be used for various types of vehicles including a vehicle driven only by an engine (internal combustion engine), an electric vehicle, and a fuel cell vehicle, as well as a hybrid vehicle that is intended in the embodiment.

The input device 14 includes a tandem master cylinder 34 and a first reservoir 36. The tandem master cylinder 34 is capable of generating a fluid pressure when the driver operates the brake pedal 12. The first reservoir 36 is attached to the master cylinder 34. The master cylinder 34 has a cylinder tube 38 in which a first piston 40*a* and a second piston 40*b* are disposed slidably and spaced apart from each other by a predetermined distance in an axial direction of the cylinder tube 38. The first piston 40*a* is disposed closer to the brake pedal 12 and coupled thereto via the push rod 42, while the second piston 40*b* is disposed more distant from the brake pedal 12 than the first piston 40*a*.

The first piston 40*a* and the second piston 40*b* each have a pair of piston packings 44*a*, 44*b* on ring-shaped stepped portions formed on an outer circumferential surface thereof. A back chamber 48*a* is formed between the piston packings 44*a*, 44*b* provided for the first piston 40*a*. The back chamber 48*a* communicates with a supply port 46*a* to be described later. A back chamber 48b is formed between the piston packings 44a, 44b provided for the second piston 40b. The back chamber 48b communicates with a supply port 46b to be described later. A spring member 50a is provided between the first piston 40a and the second 40b. A spring member 50b is provided between the second piston 40b and a lateral end portion of the cylinder tube 38.

It should be noted that instead of providing the piston packings 44a, 44b on the outer circumferential surfaces of the first piston 40a and the second 40b, packings may be placed on the inner circumferential surface of the cylinder tube 38.

The cylinder tube 38 of the master cylinder 34 is provided with the two supply ports 46a, 46b, two relief ports 52a, 52b and two output ports 54a, 54b. There is fluid communication between the supply port 46a, the relief port 52a, and an unillustrated reservoir chamber that is provided inside the first reservoir 36. Also, there is fluid communication between the supply port 46b, the relief port 52b, and that unillustrated reservoir chamber.

Also, the cylinder tube 38 of the master cylinder 34 has, inside it, a first pressure chamber 56a and a second pressure chamber 56b. Each of the first pressure chamber 56a and the second pressure chamber 56b controls a brake fluid pressure generated in response to a force created by the driver depressing the brake pedal 12. The first pressure chamber 56a is configured to communicate with the connection port 20a via a first fluid pressure passage 58a. The second pressure chamber 56b is configured to communicate with the connection port 20b via a second fluid pressure passage 58b.

A pressure sensor Pm is disposed between the master cylinder 34 and the connection port 2a and upstream in a first fluid pressure passage 58a. A first cutoff valve 60a that is a normally open solenoid valve is attached downstream in the first fluid pressure passage 58a. The pressure sensor Pm detects a fluid pressure, at a location upstream from the first cutoff valve 60a and closer to the master cylinder 34, in the first fluid pressure passage 58a.

A second cutoff valve 60b that is a normally open solenoid valve is attached between the master cylinder 34 and the connection port 20b and upstream in a second fluid pressure passage 58b. A pressure sensor Pp is attached downstream in the second fluid pressure passage 58b. The pressure sensor Pp detects a fluid pressure, at a location downstream from the second cutoff valve 60b and closer to the wheel cylinders 32FR, 32RL, 32RR and 32FL, in the second fluid pressure passage 58b.

Each of the first cutoff valve 60a and the second cutoff valve 60b that is a normally open valve is held opened when the valve is not activated (not energized). In FIG. 2, the first cutoff valve 60a and the second cutoff valve 60b are in the activated (energized) state (a third cutoff valve 62 to be described later is also in the activated (energized) state)

The second fluid pressure passage 58b between the master cylinder 34 and the second cutoff valve 60b is provided with a branch fluid pressure passage 58c branching from the second fluid pressure passage 58b. The branch fluid pressure passage 58c has the third cutoff valve 62 that is a normally closed solenoid valve and a stroke simulator 64. The third cutoff valve 62 and the stroke simulator 64 are connected in series to the branch fluid pressure passage 58c. The third cutoff valve 62 that is a normally closed valve is held closed when the valve is not activated (not energized).

The stroke simulator 64 is a device for creating a reaction force and a stroke which are commensurate with the driver's operation of the brake pedal 12 when the first cutoff valve 60a and the second cutoff valve 60b are closed. The stroke simulator 64 is connected to the master cylinder 34 through the branch fluid pressure passage 58c. The branch fluid pressure passage 58c branches from between the second cutoff valve 60b and a port 65a of the master cylinder 34. That is, a brake fluid from the second pressure chamber 56b of the master cylinder 34 is supplied to a fluid pressure chamber 65 of the stroke simulator 64 through the second fluid pressure passage 58b, through the branch fluid pressure passage 58c, and then through the port 65a.

The stroke simulator 64 includes a first return spring 66a, a second return spring 66b, and a simulator piston 68. The first return spring 66a and the second return spring 66b are arranged in series. The first return spring 66a has a higher spring constant than that of the second return spring 66b. The simulator piston 68 is urged by the first return spring 66a and the second return spring 66b toward the port 65a. The stroke simulator 64 operates in such a manner that the increasing gradient of a counteracting force of a pedal relative to the depression amount of the pedal is relatively small for approximately a first half of the maximum depression amount while it is relatively large for approximately a second half of the maximum depression amount. Thus, the brake pedal gives the driver the same feel as that produced by a conventional master cylinder.

In the vehicle brake system 10, there are the fluid pressure passages that are included in the first fluid pressure system 70a, and the fluid pressure passages that are included in the second fluid pressure system 70b. The first fluid pressure system 70a connects the first pressure chamber 56a of the master cylinder 34 and the wheel cylinders 32FR, 32RL to each other, while the second fluid pressure system 70b connects the second pressure chamber 56b of the master cylinder 34 and the wheel cylinders 32RR, 32FL to each other.

The first fluid pressure system 70a includes the first fluid pressure passage 58a, and the piping tubes 22a, 22b, 22c, 22g and 22h. The first fluid pressure passage 58a connects an output port 54a of the master cylinder 34 (the cylinder tube 38) and the connection port 20a of the input device 14 to each other. The piping tubes 22a, 22b connect the connection port 20a of the input device 14 and the output port 24a of the motor cylinder device 16 to each other. The piping tubes 22b, 22c connect the output port 24a of the motor cylinder device 16 and the introduction port 26a of the VSA device 18 to each other. The piping tube 22g connects the discharge port 28a of the VSA device 18 and the wheel cylinder 32FR to each other. The piping tube 22h connects the discharge port 28b of the VSA device 18 and the wheel cylinder 32RL to each other.

The second fluid pressure system 70b includes the second fluid pressure passage 58b, and the piping tubes 22d, 22e, 22f, 22i and 22j. The second fluid pressure passage 58b connects an output port 54b of the master cylinder 34 (the cylinder tube 38) and the connection port 20b of the input device 14 to each other. The piping tubes 22d, 22e connect the connection port 20b of the input device 14 and the output port 24b of the motor cylinder device 16 to each other. The piping tubes 22e, 22f connect the output port 24b of the motor cylinder device 16 and the introduction port 26b of the VSA device 18 to each other. The piping tube 22i connects the discharge port 28c of the VSA device 18 and the wheel cylinder 32RR to each other. The piping tube 22j connects the discharge port 28d and the wheel cylinder 32FL to each other.

Thus, the first fluid pressure system 70a and the second fluid pressure system 70b constitute a total of two fluid pressure passages: the first fluid pressure passage 58a and the second fluid pressure passage 58b. The first fluid pressure passage 58a connects the output port 54a of the master cylinder 34 and the respective wheel cylinders 32FR, 32RL to each other. The second fluid pressure passage 58b connects the output port 54b of the master cylinder 34 and the respective wheel cylinders 32RR, 32FL. As a result, the wheel cylinders 32FR, 32RL can be actuated independently from the wheel cylinders 32RR, 32FL. Consequently, two independent braking forces can be generated.

The motor cylinder device 16 has an actuator mechanism 74 that includes an electric motor 72 and a cylinder mechanism 76 that is actuated by the actuator mechanism 74.

The actuator mechanism 74 has a gear mechanism (speed reduction mechanism) 78 provided at an output shaft side of the electric motor 72, and a ball screw structure 80. The gear mechanism 78 includes a plurality of gears that mesh with each other to transmit a rotary driving force of the electric motor 72. The ball screw structure 80 includes a ball screw shaft 80a and balls 80b. The ball screw shaft 80a receives the rotary driving force from the gear mechanism 78 and thereby moves forward and rearward in an axial direction of the ball screw shaft 80a.

The cylinder mechanism 76 has an approximately cylindrically shaped cylinder body 82 and a second reservoir 84 attached to the cylinder body 82. The second reservoir 84 is connected to the first reservoir 36 by a piping tube 86. The second reservoir 84 is configured in such a manner that a brake fluid held in the first reservoir 36 is supplied to the second reservoir 84 via the piping tube 86.

The cylinder body 82 has therein a first slave piston 88a and a second slave piston 88b disposed slidably and spaced from each other by more than a predetermined distance in an axial direction of the cylinder body 82. The first slave piston 88a is disposed adjacent to the ball screw structure 80. The first slave piston 88a makes contact with one end portion of the ball screw shaft 80a to be displaced together with the ball screw shaft 80a in a direction of arrow X1 or X2. The second slave piston 88b is spaced more distant from the ball screw structure 80 than the first slave piston 88a.

The first slave piston 88a and the second slave piston 88b each have a pair of slave piston packings 90a, 90b on ring-shaped stepped portions formed on an outer circumferential surface thereof. A first back chamber 94a is formed between the slave piston packings 90a, 90b provided for the first slave piston 88a. The first back chamber 94a communicates with a reservoir port 92a to be described later. A second back chamber 94b is formed between the slave piston packings 90a, 90b provided for the second slave piston 88b. The second back chamber 94b communicates with a reservoir port 92b to be described later. A first return spring 96a is provided between the first slave piston 88a and the second slave piston 88b. A second return spring 96b is provided between the second slave piston 88b and the cylinder body 82.

The cylinder body 82 of the cylinder mechanism 76 is provided with the two reservoir ports 92a, 92b and the two output ports 24a, 24b. The reservoir port 92a (92b) is in communication with an unillustrated reservoir chamber in the second reservoir 84.

The cylinder body 82 has therein a first fluid pressure chamber 98a for controlling a brake fluid pressure to be output from the output port 24a to the wheel cylinders 32FR and 32RL and a second fluid pressure chamber 98b for controlling a brake fluid pressure to be output from the output port 24b to the wheel cylinders 32RR, 32FL.

A limiting means 100 is provided between the first slave piston 88a and the second slave piston 88b for limiting a maximum stroke (maximum displacement distance) and a minimum stroke (minimum displacement distance) of each of the first slave piston 88a and the second slave piston 88b. Further, the second slave piston 88b is provided with a stopper pin 102 for limiting a range of sliding of the second slave piston 88b to prevent overreturn of the second slave piston 88b toward the first slave piston 88a. Because of the presence of the stopper pin 102, in the event of failure of one of the two fluid pressure systems, especially at the time of a backup in brake control using the brake fluid pressure generated by the master cylinder 34, the other fluid pressure system is prevented from being affected by that failure.

The VSA device 18, that may be a well-known one, has: a first brake system 110a and a second brake system 110b. The first brake system 110a controls the first fluid pressure system 70a connected to the disc brake mechanisms 30a, 30b (the wheel cylinder 32FR, the wheel cylinder 32RL) provided on the right front wheel and the left rear wheel. The second brake system 110b controls the second fluid pressure system 70b connected to the disc brake mechanisms 30c, 30d (the wheel cylinder 32RR, the wheel cylinder 32FL) provided on the right rear wheel and the left front wheel. The first brake system 110a may be a fluid pressure system connected to disc brake mechanisms provided on the left front wheel and the right front wheel. The second brake system 110b may be a fluid pressure system connected to disc brake mechanisms provided on the left rear wheel and the right rear wheel. Further, the first brake system 110a may be a fluid pressure system connected to disc brake mechanisms provided on the right front wheel and the right rear wheel at one side of the vehicle body. The second brake system 110b may be a fluid pressure system connected to disc brake mechanisms provided on the left front wheel and the left rear wheel at the other side of the vehicle body.

The first brake system 110a and the second brake system 110b have the same structure, and in the following descriptions, the same components are denoted the same reference, and duplicate descriptions are omitted by enclosing components of the second brake system 110b in parenthesis following corresponding components of the first brake system 110a.

The first brake system 110a (the second brake system 110b) has a first common fluid pressure passage 112 and a second common fluid pressure passage 114 that are common to the wheel cylinders 32FR, 32RL (32RR, 32FL). The VSA device 18 includes: a regulator valve 116 that is a normally open solenoid valve disposed between the introduction port 26a (26b) and the first common fluid pressure passage 112; a first check valve 118 disposed in parallel to the regulator valve 116 for allowing communication of the brake fluid from the introduction port 26a (26b) side to the first common fluid pressure passage 112 side (for blocking communication of the brake fluid from the first common fluid pressure passage 112 side to the introduction port 26a (26b) side); a first in valve 120 that is a normally open solenoid valve disposed between the first common fluid pressure passage 112 and the discharge port 28a (28d); a second check valve 122 disposed in parallel to the first in valve 120 for allowing communication of the brake fluid from the discharge port 28a (28d) side to the first common fluid pressure passage 112 side (for blocking communication of the brake fluid from the first common fluid pressure passage 112 side to the discharge port 28a (28d) side); a second in valve 124 that is a normally open solenoid valve disposed between the first common fluid pressure passage 112 and the discharge port 28b (28c); and a third check valve 126 disposed in parallel to the second in valve 124 for allowing communication of the brake fluid from the discharge port 28b (28c) side to the first common fluid pressure passage 112 side (for blocking communication of the brake fluid from the first common fluid pressure passage 112 side to the discharge port 28b (28c) side).

Further, the VSA device 18 includes: a first out valve 128 that is a normally closed solenoid valve disposed between the discharge port 28a (28d) and the second common fluid pressure passage 114; a second out valve 130 that is a normally closed solenoid valve disposed between the discharge port 28b (28c) and the second common fluid pressure passage 114; a reservoir 132 connected to the second common fluid pressure passage 114; a fourth check valve 134 disposed between the first common fluid pressure passage 112 and the second common fluid pressure passage 114 for allowing communication of the brake fluid from the second common fluid pressure passage 114 side to the first common fluid pressure passage 112 side (for blocking communication of the brake fluid from the first common fluid pressure passage 112 side to the second common fluid pressure passage 114 side); a pump 136 disposed between the fourth check valve 134 and the first common fluid pressure passage 112 for supplying the brake fluid from the second common fluid pressure passage 114 side to the first common fluid pressure passage 112 side; a suction valve 138 and an exhaust valve 140 sandwiching the pump 136 therebetween; a motor M for driving the pump 136; and a suction valve 142 that is a normally closed solenoid valve disposed between the second common fluid pressure passage 114 and the introduction port 26a (26b).

In the first brake system 110a, a pressure sensor Ph is provided at a location close to the introduction port 26a in a fluid pressure passage for detecting the brake fluid pressure that is controlled by the first fluid pressure chamber 98a of the motor cylinder device 16 and output from the output port 24a of the motor cylinder device 16. Signals detected by the pressure sensors Pm, Pp and Ph, respectively, are transmitted to an unillustrated controlling means.

<Input Device>

Figure 3:
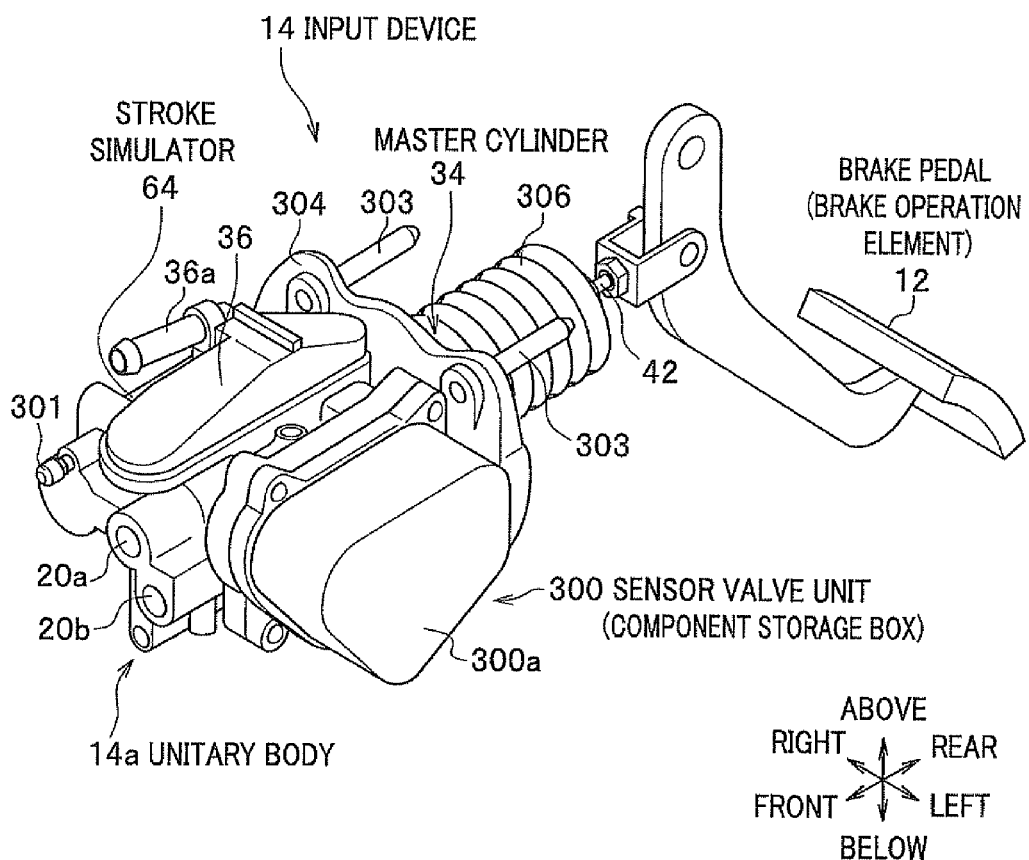
FIG. 3 is a perspective view showing the entirety of the input device according to the embodiment.
Figure 4A:
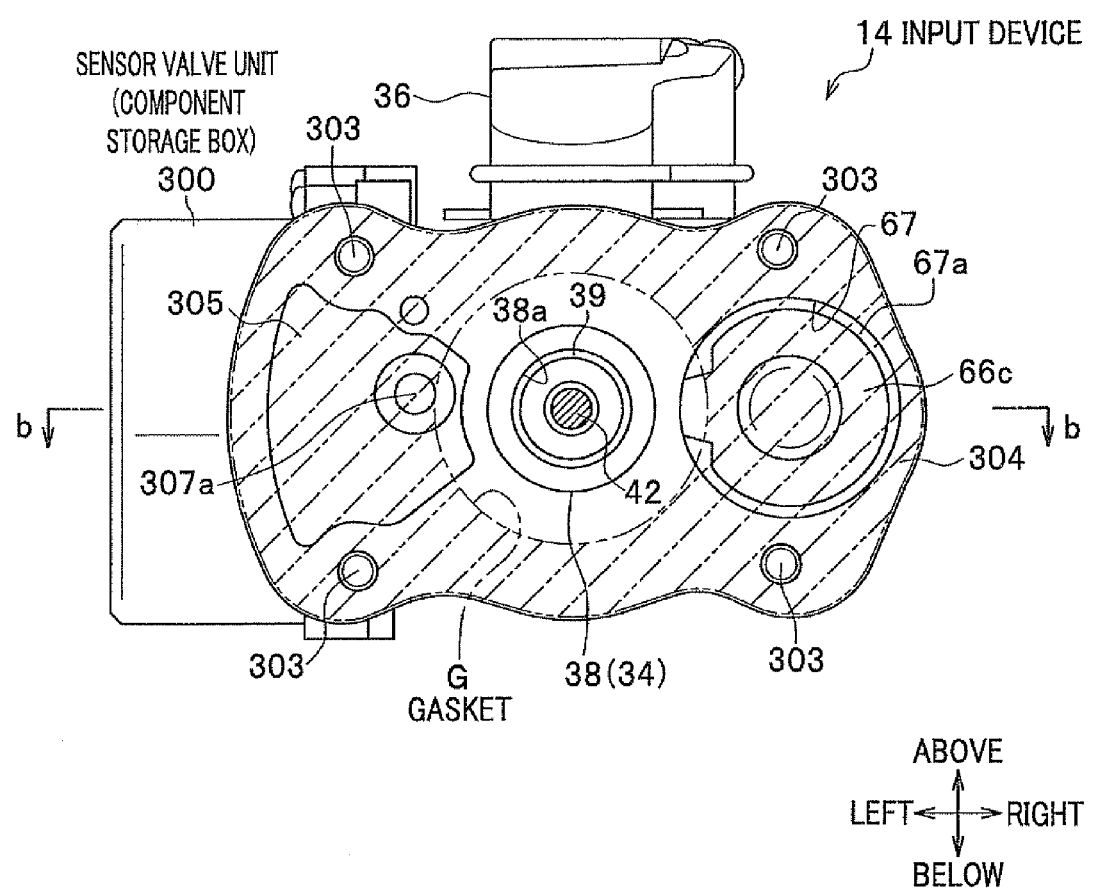
FIG. 4A is a rear view of the input device according to the embodiment.
Figure 4B:
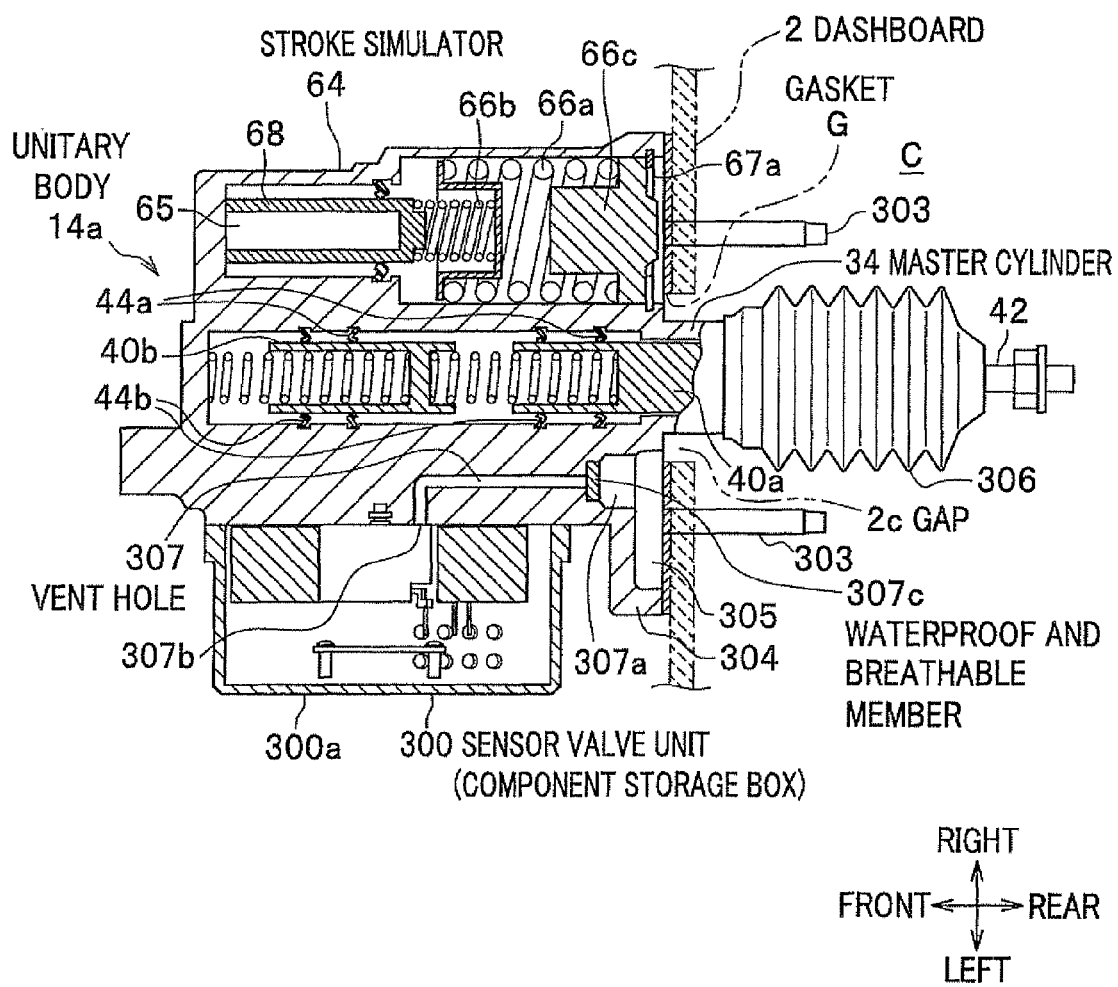
FIG. 4B is a partial cross sectional view taken on line b-b of FIG. 4A.

Now, the input device 14 of the vehicle brake system 10 will be described in further detail. FIG. 3 is a perspective view showing the entirety of the input device according to the embodiment. FIG. 4A is a rear view of the input device according to the embodiment. FIG. 4B is a partial cross sectional view taken on line b-b of FIG. 4A. In FIGS. 4A and 4B, the brake pedal is omitted for the convenience of illustration. In FIG. 4A, the boot is omitted. In FIG. 4B, the boot is shown in outer appearance but not in cross sectional view taken on line b-b of FIG. 4A.

As shown in FIG. 3, the master cylinder 34, which is a component of the input device 14, extends in the longitudinal direction of the vehicle V (See FIG. 1). The stroke simulator 64 and the master cylinder 34 form a parallel attachment body 14a, with the stroke simulator 64 disposed in parallel to the master cylinder 34. More specifically, the stroke simulator 64 is positioned on the right of the master cylinder 34 and in parallel thereto (at an outward area in the transverse direction of the vehicle V shown in FIG. 1). The master cylinder 34 and the stroke simulator 64 are integrally molded of a metal, together with a stud plate 304 whose rear end portion supports the master cylinder 34 and the stroke simulator 64. Thus, an outer body of the stroke simulator 64, an outer body of the master cylinder 34, and the stud plate 304 have a continuous shape. The parallel attachment body 14a is formed by casting.

Above the master cylinder 34 and the stroke simulator 64, there is disposed the first reservoir 36 (See FIG. 3). The first reservoir 36 extends in the longitudinal direction of the vehicle, and overlies, and bridges, the master cylinder 34 and the stroke simulator 64, in such a manner that the first reservoir 36 extends in the longitudinal direction of the vehicle. The first reservoir 36 and the master cylinder 34 are configured to communicate with each other. That is, the first reservoir 36 communicates with the first pressure chamber 56a and the second pressure chamber 56b and the back chambers 48a, 48b shown in FIG. 2 through connection ports formed to communicate with the relief ports 52a, 52b and the supply ports 46a, 46b shown in FIG. 2. In FIG. 3, Reference 36a denotes a connector to which a base end of the piping tube 86 is connected. The piping tube 86 allows the first reservoir 36 and the second reservoir 84 which is shown in FIG. 2 to communicate with each other. The connector 36a is made of a tubular member and forms a forward projection of the input device 14.

As shown in FIG. 3, the master cylinder 34 has the connection port 20a and the connection port 20b on the front side thereof. Connected to the connection port 20a is a base end of the piping tube 22a which extends to the joint 23a shown in FIG. 1. Connected to the connection port 20b is a base end of the piping tube 22d which extends to the joint 23b shown in FIG. 1.

As shown in FIG. 3, a bleeder 301 is provided at the right of the input device 14 for bleeding remaining air when the master cylinder 34, the stroke simulator 64 and the like are filled with the brake fluid. A sensor valve unit 300 to be described later is provided on the left side of the input device 14. It should be noted that, in the Claims, the sensor valve unit 300 corresponds to the terms "component storage box", "sensor unit" and "valve unit". In FIG. 3, while Reference 300 is given the term "component storage box", as well as the term "sensor valve unit" that is used in the Claims, mention of the terms "sensor unit" and "valve unit" that correspond to the sensor valve unit 300 in the Claims is omitted.

As shown in FIG. 3, on the rear side of the input device 14, the master cylinder 34 extends further rearward across the stud plate 304. The master cylinder 34 has a rear end to receive, as described above, one end of the push rod 42 the other end of which is coupled to the brake pedal 12 (See FIG. 2). In FIG. 3, Reference 306 denotes a boot extending over from the master cylinder 34 to the push rod 42.

As shown in FIG. 4A, an opening 38a is formed at the rear end of the master cylinder 34 for allowing the first piston 40a and the second piston 40b (See FIG. 2) to pass through to be inserted in, and fitted in, the cylinder tube 38 of the master cylinder 34. The opening 38a is provided with a ring member 39 and an unillustrated packing to be disposed at the rear of the first piston 40a (See FIG. 2). The first piston 40a which is urged rearward abuts against the ring member 39, so that the ring member 39 prevents the first piston 40a from moving rearward farther across a predetermined location.

As shown in FIG. 4A, an opening 67 is formed on a rear surface of the stud plate 304, that is, in a surface thereof opposed to the dashboard 2 (See FIG. 1) for allowing the first return spring 66a and the second return spring 66b, the simulator piston 68 and the like to pass through to be inserted in, and fitted in, the stroke simulator 64. A ring member 67a is provided in the opening 67 of the rear surface of the stud plate 304 for securing a spring sheet 66c and an unillustrated packing. The spring sheet 66c supports a rear end, shown in FIG. 2, of the first return spring 66a.

The parallel attachment body 14a, which includes the master cylinder 34, the stroke simulator 64 and the stud plate 304, is attached to the dashboard 2 via a gasket G, as shown in FIGS. 4A and 4B.

The gasket G extends along an outer periphery of the surface of the stud plate 304 that is opposed to the dashboard 2, as shown in FIG. 4A. More specifically, the gasket G has approximately the same outline as the surface of the stud plate 304 that is opposed to the dashboard 2, and has at the center thereof a circular cutout with a diameter greater than an outer diameter of the master cylinder 34. The cutout communicates with a lightening portion 305 to be described later and the aforementioned opening 67 of the stud plate 304.

When attached to the dashboard via the gasket G, the parallel attachment body 14a has a portion that extends through a space formed in the dashboard 2 into the vehicle compartment C, as shown in FIG. 4B, forming a gap 2c between the master cylinder 34 and the dashboard 2. Through the gap 2c, the lightening portion 305 to be described later communicates with the vehicle compartment C.

In FIG. 4A, Reference 36 denotes the first reservoir; Reference 42 denotes the push rod (in FIG. 4A, indicated by a hatched area); Reference 303 denotes the stud bolt; Reference 300 denotes the sensor valve unit; Reference 305 denotes the lightening portion in the stud plate 304; and Reference 307a denotes an opening of a vent hole 307 (See FIG. 4B) to be described later.

Now, an inner structure of the input device 14 will be described in further detail.

As shown in FIG. 4B, when the input device 14 is attached to the dashboard 2 in such a manner the master cylinder 34 extends in the longitudinal direction of the vehicle V (See FIG. 1), the stroke simulator 64 is positioned on the right of the master cylinder 34 and in parallel thereto (at an outward area in the transverse direction of the vehicle V shown in FIG. 1). As aforementioned, the master cylinder 34 has a portion that extends rearward farther than the stud plate 304 to penetrate through the dashboard 2 into the vehicle compartment C.

Inside the master cylinder 34 and the stroke simulator 64 of the parallel attachment body 14a, the first piston 40a and the second piston 40b of the master cylinder 34 have a common axis that extends approximately in parallel to a common axis of the first return spring 66a, the second return spring 66b, and the simulator piston 68 of the stroke simulator 64.

Although not illustrated in FIG. 4B, the parallel attachment body 14a has in an inside (solid portion) disposed therein and having the first fluid pressure passage 58a, the second fluid pressure passage 58b and the branch fluid pressure passage 58c(See FIG. 2) all formed therein by processing (piercing).

Next, there will be described the first cutoff valve 60a, the second cutoff valve 60b and the third cutoff valve 62, and the pressure sensors Pp, Pm, shown in FIG. 2, together with the sensor valve unit 300.

The sensor valve unit 300 is attached to the parallel attachment body 14a, as shown in FIG. 4B. More specifically, the sensor valve unit 300 is positioned on the left side of the master cylinder 34 and in parallel thereto (at an inward area in the transverse direction of the vehicle V shown in FIG. 1).

The sensor valve unit 300 includes a housing 300a, a pressure sensor mechanism, and a valve mechanism, and a circuit substrate that is electrically connected to the pressure sensor mechanism and the valve mechanism. The pressure sensor mechanism, the valve mechanism, and the circuit substrate are disposed inside the housing 300a.

There is no particular limitation on the pressure sensor mechanism so far as it includes the pressure sensors Pp and Pm shown in FIG. 2 and so far as it can detect the fluid pressure in the first fluid pressure passage 58a at the location upstream from the first cutoff valve 60a and the fluid pressure in the second fluid pressure passage 58b at the location downstream from the second cutoff valve 60b. As a specific example of such a pressure sensor mechanism, there is mentioned a pressure sensor mechanism that includes: plungers; the pressure sensors Pp and Pm provided at tip ends of the respective plungers; and the circuit substrate. The plungers are inserted in monitor holes (not illustrated) that are bored through the parallel attachment body 14a from the sensor valve unit 300 side to respectively communicate with the first fluid pressure passage 58a and the second fluid pressure passage 58b in which the fluid pressures are detected. The circuit substrate has a pressure detection circuit electrically connected to the pressure sensors Pp and Pm for processing the signals detected by the pressure sensors Pp and Pm and for performing an arithmetic computation on the thus obtained data.

There is no particular limitation on the valve mechanism so far as it has the functions of the first cutoff valve 60a, the second cutoff valve 60b and the third cutoff valve 62. As a specific example of such a valve mechanism, there is mentioned a valve mechanism that includes: bar-shaped valve bodies with tip ends thereof inserted in bores that are formed in the parallel attachment body 14a from the sensor valve unit 300 side to respectively cross the first fluid pressure passage 58a and the second fluid pressure passage 58b and the branch fluid pressure passage 58c; coils for moving the bar-shaped valve bodies forward and rearward in the bores by electromagnetic induction; the circuit substrate having a control circuit electrically connected to the coils for controlling the timings of the forward and rearward movements of the bar-shaped valve bodies; and a power source for supplying electric power to the coils via the circuit substrate.

It should be noted that the components of the pressure sensor mechanism and the components of the valve mechanism each correspond to the term "component attached to at least one of the master cylinder and the stroke simulator" used in the Claims.

In the embodiment, the components of the pressure sensor mechanism and the components of the valve mechanism are only mounted in the sensor valve unit 300 which is the "component storage box", although any component that may be attached to the master cylinder 34 and the stroke simulator 64 is covered by the term "component attached to at least either one of the master cylinder and the stroke simulator".

As shown in FIG. 4B, the parallel attachment body 14a has, in the solid portion thereof, the vent hole 307 with a first end in communication with the housing 300a of the sensor valve unit 300.

As shown in FIG. 4B, the vent hole 307 extends from the sensor valve unit 300 toward the master cylinder 34 and, on its way to the master cylinder 34, bends to the rear of the vehicle V along the longitudinal direction of the master cylinder 34 to terminate at a second end thereof in communication with a space formed before an "input-device 14 mounted surface" of the dashboard 2. In the embodiment, the input-device 14 mounted surface refers to a surface of the dashboard 2 on which a plan shape of the stud plate 304 is projected when the input device 14 is attached to the dashboard 2.

More specifically, the second end of the vent hole 307 is in communication with the lightening portion 305 formed in the stud plate 304. In other words, the vent hole 307 is a communication hole through which an opening 307b formed in the housing 300a of the sensor valve unit 300 is in communication with the opening 307a formed in the lightening portion 305. The lightening portion 305 is formed during a process of casting the parallel attachment body 14a.

As shown in FIG. 4A, the opening 307a is formed close to the master cylinder 34.

The opening 307a has a waterproof and breathable member 307c (made of GORE-TEX® for example) disposed thereon.

In FIG. 4B, Reference 42 denotes the push rod, Reference 65 denotes the fluid pressure chamber of the stroke simulator 64, Reference 303 denotes the stud bolt, and Reference 303 denotes the boot.

The configuration of the input device 14 and the configuration of the vehicle brake system 10 including the input device 14 have been described. Now, the operations of these will be described hereinafter.

Under normal conditions when the vehicle brake system 10 functions normally, the first cutoff valve 60a and the second cutoff valve 60b that are normally open solenoid valves are energized to be closed whereas the third cutoff valve 62 that is a normally closed solenoid valve is energized to be opened. Thus, since flow of the brake fluid through the first fluid pressure system 70a and the second fluid pressure system 70b is cut off by the first cutoff valve 60a and the second cutoff valve 60b cut off, the brake fluid pressure generated by the master cylinder 34 of the input device 14 is not transmitted to the wheel cylinders 32FR, 32RL, 32RR and 32FL of the disc brake mechanisms 30a-30d.

At this time, the brake fluid pressure generated by the second pressure chamber 56b of the master cylinder 34 is transmitted to the fluid pressure chamber 65 of the stroke simulator 64 through the branch fluid pressure passage 58c and through the third cutoff valve 62 that is held opened. The brake fluid pressure applied to the fluid pressure chamber 65 serves to shift the simulator piston 68 against a spring force of each of the first return spring 66a and the second return spring 66b. As a result, the stroke of the brake pedal 12 is accepted and a simulated pedal reaction force is generated and provided for the brake pedal 12. Consequently, the driver perceives the brake pedal feel to which he is accustomed.

When the system is in the above-described state, the unillustrated controlling means, when detecting the driver's depression of the brake pedal 12, actuates the electric motor 72 of the motor cylinder device 16, which urges the actuator mechanism 74 to displace the first slave piston 88a and the second slave piston 88b in the direction of arrow X1 shown in FIG. 1 against the spring force of each of the first return spring 96a and the second return spring 96b. As a result, the first fluid pressure chamber 98a and the second fluid pressure chamber 98b are pressurized in a well-balanced manner to generate a desired brake fluid pressure.

The brake fluid pressure in the first fluid pressure chamber 98a and the second fluid pressure chamber 98b of the motor cylinder device 16 is transmitted to the wheel cylinders 32FR, 32RL, 32RR and 32FL of the disc brake mechanisms 30a-30d through the first in valve 120 and the second in valve 124 of the VSA device 18 that are held opened to actuate the wheel cylinders 32FR, 32RL, 32RR and 32FL and thus provide a desired braking force for each of the wheels.

In other words, under normal conditions when the motor cylinder device 16 that functions as a power source for generating a fluid pressure and an unillustrated ECU that makes by-wire control, are able to be actuated, the driver's depression of the brake pedal 12 causes the first cutoff valve 60a and the second cutoff valve 60b to be closed to cut off flow of the brake fluid between the master cylinder 34 that generates the brake fluid pressure and the disc brake mechanisms 30a-30d (the wheel cylinders 32FR, 32RL, 32RR and 32FL) that control the wheels, while the disc brake mechanisms 30a-30d are activated by the brake fluid pressure generated by the motor cylinder device 16. That is, the so-called "brake-by-wire system" becomes active. Thus, the input device 14 is preferably applied to, for example, the vehicle V, such as an electric vehicle, which does not include a vacuum booster driven by a conventionally utilized internal combustion engine.

On the other hand, under abnormal conditions in which components such as the motor cylinder device 16 are not able to be actuated, the first cutoff valve 60a and the second cutoff valve 60b are held opened and the third cutoff valve 62 is held closed, while the brake fluid pressure generated by the master cylinder 34 is transmitted to the disc brake mechanisms 30a-30d (the wheel cylinders 32FR, 32RL, 32RR and 32FL) to actuate the disc brake mechanisms 30a-30d (the wheel cylinders 32FR, 32RL, 32RR and 32FL). That is, a conventional so-called hydraulic brake system becomes active.

As described above, since the input device 14 can be disposed separately from the motor cylinder device (electric brake actuator) 16, the input device 14 and the motor cylinder device 16 can be downsized to thereby increase the possibility of the layout of the vehicle brake system 10 in the engine room (room where the power generation device 3 is mounted).

Meanwhile, the engine room R has therein structures such as the electric system, the suction system, the exhaust system, and the cooling system as well as the power generation device 3, which makes it difficult to ensure a large empty space (installation space) in the engine room R. Thus, in the embodiment, by arranging the input device 14, the motor cylinder device 16 and the VSA device 18 separately from each other in the engine room R, the individual devices (the input device 14, the motor cylinder device 16, the VSA device 18) can be downsized, eliminating the need for ensuring a large empty space in the engine room R. As a result, it becomes possible to mount those devices in a rather small space of the engine room R, facilitating the layout of the vehicle brake system 10.

Also, according to the input device 14 of the vehicle brake system 10, by arranging the motor cylinder device 16 and the VSA device 18 separately from each other, the motor cylinder device 16, the VSA device 18 and the like become more versatile and thus more applicable to various types of vehicles.

Further, according to the input device 14 of the vehicle brake system 10, by disposing the motor cylinder device 16 remotely from a driver seat, the driver can avoid feeling odd (uncomfortable) with noise and oscillations arising from the motor cylinder device 16 when the motor cylinder device 16 is a source of noise and oscillations.

Still further, according to the input device 14 of the vehicle brake system 10, since the stroke simulator 64 is formed integrally with the master cylinder 34, a downsized (compact) input device can be realized.

Yet further, according to the input device 14 of the vehicle brake system 10, the components attached to the master cylinder 34 and the stroke simulator 64 (for example, components of the pressure sensor mechanism and the valve mechanism) can be mounted in the sensor valve unit 300 ("component storage box"), and the sensor valve unit 300 can be attached to the parallel attachment body 14a including the master cylinder 34 and the stroke simulator 64. As a result, a downsized (compact) input device can be realized.

In the input device 14, the sensor valve unit 300 is provided on the parallel attachment body 14a. In the meanwhile, while the vehicle V is being operated, the temperature of the engine room R increases because of heat generation of the power generation device 3 and the like. On the contrary, while the operation of the vehicle V is being stopped, the temperature of the engine room R decreases to the ambient temperature (in the wintertime, to below zero), If the input device 14 is subjected to such significant temperature changes, condensation possibly forms inside the housing 300a which is a component of the sensor valve unit 300. If the housing 300a is airtight to prevent water intrusion, the temperature changes cause changes in gas volume, which leads to repeated application of stress to the housing 300a. One measure to be taken to prevent the condensation formation and the repeated stress application is to form an aperture in the housing 300a by piercing through a wall thereof.

The formation of the aperture, which allows communication between the engine room R and the sensor valve unit 300, however, might cause a risk of intrusion of water into the engine room R(at the time of washing of the vehicle or submersion of the vehicle V, for example). To reduce the risk of water intrusion into the sensor valve unit 300, it is conceived to make the aperture have a labyrinth structure. This, however, leads to the problems of a complicated manufacturing process and increased manufacturing costs.

On the other hand, according to the input device 14 of the vehicle brake system 10, the vent hole 307 formed in the parallel attachment body 14a has the first end in communication with the sensor valve unit 300 and the second end in communication with the space formed before the input-device 14 mounted surface.

Since the second end of the vent hole 307 which serves as an aperture of the sensor valve unit 300 is covered with the dashboard 2 to prevent intrusion of foreign matter and water through the vent hole 307 into the sensor valve unit 300, the input device 14 has improved reliability in the behaviors of the pressure sensor mechanism and the valve mechanism stored inside the sensor valve unit 300.

According to the input device 14 of the vehicle brake system 10, the portion (rear portion) of the master cylinder 34 extends through the dashboard 2 into the vehicle compartment C, and the second end of the vent hole 307 that is in communication with the space formed before the input-device 14 mounted surface is formed close to the master cylinder 34. Thus, as aforementioned, air is allowed to flow between the vent hole 307 and the vehicle compartment C through the gap 2c formed between the master cylinder 34 and the dashboard 2. At that time, air is allowed to flow between the sensor valve unit 300 that is disposed in the engine room R and mainly the vehicle compartment C in which the temperature changes are more moderate than in the engine room R. As a result, the condensation formation inside the sensor valve unit 300 can be more surely prevented.

According to the input device 14 of the vehicle brake system 10, the gasket G enables communication of the vent hole 307 with the engine room R only through the gap 2c formed between the master cylinder 34 and the dashboard 2. This prevents more effectively intrusion of foreign matter and water through the vent hole 307 from the outside into the sensor valve unit 300. This is also effective at the time of submersion of the vehicle because the sensor valve unit 300 is in communication with the vehicle compartment C that is more difficult for water to enter than the engine room R.

According to the input device 14 of the vehicle brake system 10, the opening 307a of the vent hole 307 is covered with the waterproof and breathable member 307c, to surely prevent foreign matter such as dust and the like(including water droplet) in the vehicle compartment C from intruding through the vent hole 307 into the sensor valve unit 300.

Also, according to the input device 14 of the vehicle brake system 10, since the vent hole 307 is formed in the solid portion of the parallel attachment body 14a along the longitudinal direction of the master cylinder 34, it is possible to downsize the input device 14. Further, the vent hole 307 can be formed easily by piercing through the parallel attachment body 14a.

According to the input device 14 of the vehicle brake system 10, since the vent hole 307 has the second end in communication with the lightening portion 305, the lightening portion 305 not only contributes to weight reduction of the input device 14 but can also function as a dry area formed on the second end of the vent hole 307.

According to the input device 14 of the vehicle brake system 10, the parallel attachment body 14a is formed by casting and the lightening portion 305 is formed during the casting process. Thus, since the lightening portion 305 is formed using a mold produced in consideration of shrinkage, running of molten metal, and the like, at the time of casting, there is no need to provide a separate processing process such as machining only for forming the lightening portion 305, resulting in improved production efficiency.

In the embodiment, the master cylinder 34 and the stroke simulator 64 are configured to be arranged in parallel to each other and disposed substantially horizontally. However, they may be configured to be disposed substantially vertically instead.

Also, in the embodiment, it is intended that the master cylinder 34 and the stroke simulator 64 are arranged in parallel to each other. However, the master cylinder 34 and the stroke simulator 64 may be displaced from each other by a permissible distance in the longitudinal axis direction thereof.

Also, in the embodiment, the sensor valve unit 300 is disposed in parallel to the master cylinder 34. However, the sensor valve unit 300 may be disposed in parallel to the stroke simulator 64, or may be configured to bridge the master cylinder 34 and the stroke simulator 64.

Also, in the embodiment, the input device 14 of the vehicle brake system 10 is applied to a right-hand drive vehicle. However, the input device 14 of the vehicle brake system 10 is also applicable to a left-hand drive vehicle.

According to the present invention, there is provided an input device of a vehicle brake system that can increase the possibility of the layout of the vehicle brake system.

The embodiment of the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. An input device of a vehicle brake system, the input device being disposed as a separate unit from an electric brake actuator, the input device having a portion disposed in an engine room of the vehicle and a brake operation element extending from the portion and through a vehicle firewall, which separates the engine room and a passenger compartment of the vehicle, for being operated by a driver, the electric brake actuator provided for generating a first fluid pressure on the basis of at least an electric signal produced according to operation of the brake operation element, the input device of the vehicle brake system comprising:

a master cylinder for generating a second fluid pressure when the operation of the brake operation element is input into the master cylinder;

a stroke simulator for applying a simulated reaction force, produced by the operation of the brake operation element, to the brake operation element, the stroke simulator and the master cylinder forming an attachment body, with the stroke simulator disposed in parallel to the master cylinder and in communication with the master cylinder; and a component storage box provided on a portion of the attachment body spaced away from the stroke simulator and having a hollow inside space formed therein, wherein the component storage box houses a sensor unit containing a sensor for detecting the second fluid pressure in a fluid pressure passage, the fluid pressure passage communicating with at least one of the master cylinder and the stroke simulator;

wherein the attachment body has a vent passage formed therein with a first end in communication with the hollow inside space of the component storage box, and a second end in communication with another space formed in the attachment body and facing a surface of the firewall having the input device mounted thereon; and wherein a gap is formed between the master cylinder and the firewall, and said another space formed in the attachment body opens into the gap to allow air to flow between the vent passage and a passenger compartment of the vehicle through the gap.

2. The input device of the vehicle brake system of claim 1, wherein the master cylinder has a portion extending through the firewall into the passenger compartment, and the second end of the vent passage is formed close to the master cylinder.

3. The input device of the vehicle brake system of claim 2, wherein the attachment body is attached to the firewall via a gasket, the gasket extending along an outer periphery of the attachment body.

4. The input device of the vehicle brake system of claim 3, further comprising a waterproof and breathable filter member disposed at the second end of the vent passage and proximate the firewall.

5. The input device of the vehicle brake system of claim 3, wherein said another space formed in the attachment body defines a lightening portion, the lightening portion having one side which engages a surface of the gasket or of the firewall having the input device mounted thereon, the second end of the vent passage being in communication with the lightening portion.

6. The input device of the vehicle brake system of claim 5, wherein the attachment body is formed by casting and the lightening portion is integrally formed therein during the casting process.

7. The input device of the vehicle brake system of claim 1, wherein the component storage box houses a valve unit containing a valve mechanism for opening and closing the fluid pressure passage communicating with at least one of the master cylinder and the stroke simulator.

8. The input device of the vehicle brake system of claim 1, wherein said another space formed in the attachment body opens directly into the gap.

9. The input device of the vehicle brake system of claim 1, wherein the second end of the vent passage extends parallel to the gap.

10. The input device of the vehicle brake system of claim 1, wherein the portion of the input device disposed in the vehicle engine room is attached to the firewall such that it completely covers one end of the gap facing into the engine room.

* * * * *